(12) United States Patent
Frederick et al.

(10) Patent No.: US 10,081,302 B1
(45) Date of Patent: Sep. 25, 2018

(54) ACTIVE AERODYNAMIC RUNNING BOARD

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US); Adam D. Holmstrom, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/640,905

(22) Filed: Jul. 3, 2017

(51) Int. Cl.
*B60R 3/02* (2006.01)
*B60R 3/00* (2006.01)

(52) U.S. Cl.
CPC ............ *B60R 3/002* (2013.01); *B60R 3/02* (2013.01)

(58) Field of Classification Search
CPC ............................... B60R 3/002; B60R 3/02
USPC ........................... 280/163, 166, 169
See application file for complete search history.

(56) References Cited

U.S. PATENT DOCUMENTS

| 6,375,207 | B1 | 4/2002 | Dean et al. | |
|---|---|---|---|---|
| 7,318,596 | B2 * | 1/2008 | Scheuring, III | B60R 3/002 280/163 |
| 8,469,380 | B2 * | 6/2013 | Yang | B60R 3/02 182/127 |
| 9,073,486 | B1 * | 7/2015 | Meszaros | B60R 3/002 |
| 9,302,626 | B2 | 4/2016 | Leitner et al. | |
| 2002/0113400 | A1 | 8/2002 | Leitner | |
| 2003/0184040 | A1 | 10/2003 | Leitner et al. | |
| 2005/0104318 | A1 | 5/2005 | Lee et al. | |
| 2006/0163836 | A1 | 7/2006 | Kobayashi | |
| 2009/0309325 | A1 | 12/2009 | Okada et al. | |
| 2010/0044993 | A1 | 2/2010 | Watson | |
| 2013/0038035 | A1 | 2/2013 | Leitner et al. | |

* cited by examiner

*Primary Examiner* — John Daniel Walters
(74) *Attorney, Agent, or Firm* — Christopher G. Darrow; Darrow Mustafa PC (57) ABSTRACT

An adjustable vehicle running board includes a step moveable between a step position, a retracted position and an aero position. A first support bracket has a first end coupled to the step and an opposite second end connected to a mounting bracket. A slide link has a first end slideably connected to the first support bracket and an opposite second end pivotally connected to the step. The first end of the slide link is moveable along a length of the first support bracket and positionable at a first slide link distance from the second end of the first support bracket when the step is arranged in the step position and a second slide link distance from the second end of the first support bracket when the step is arranged in the aero position. The first slide link distance being greater than the second slide link distance.

19 Claims, 4 Drawing Sheets

ACTIVE AERODYNAMIC RUNNING BOARD

BACKGROUND

Running boards are available as an option for larger sized vehicles, such as sport utility vehicles, pick-up trucks, mini-vans, and cross-ever vehicles. Such vehicles may have a relatively high ground clearance that could make entering and exiting the vehicle more difficult. The running board provides a step that extends longitudinally along the side of the vehicle adjacent a rocker panel to make it easier for a passenger to enter and exit the vehicle. The running board may be attached to the vehicle in a fixed position or may be configured to retract and extend. A fixed running board often extends a significant distance from a side of the vehicle and may be struck when the owner of an adjacent parked vehicle opens their door. A fixed running board may also reduce the ground clearance of a vehicle and may be damaged when the vehicle passes over an uneven surface. A fixed running board tends to disrupt airflow around the vehicle that can result in increased aerodynamic drag and decreased fuel efficiency. A retractable running board is generally movable between a retracted position, in which the step is tucked underneath an underbody of the vehicle, and an extended position, in which the step is spaced apart from the underbody of the vehicle for supporting the user. While a retractable running board may improve vehicle ground clearance, it may do little to improve vehicle aerodynamics and increase fuel efficiency.

SUMMARY

Disclosed is an automotive vehicle including an adjustable vehicle running board. The running board may be selectively moved between multiple positions. The running board may be positioned in a step position to assist a passenger with entering and exiting the vehicle. When not used as a step, the running board may be arranged in a retracted position that provides additional ground clearance and may help reduce a risk of damage to the running board. When operating the vehicle above a selected speed the running board may be arranged in an aero position to improve the vehicle's aerodynamic characteristics.

The running board may include a step that extends lengthwise along the vehicle. A linkage mechanism having multiple interconnected linkages may be used to attach the step to the vehicle and move the step between its various operating positions. A mounting bracket may be used to connect the linkage mechanism to the vehicle. The linkage mechanism may include a connector bracket pivotally connected to the step at a step pivot connection. A first support bracket may have a first end pivotably connected to the connector bracket at a first pivot connection and an opposite second end pivotally connected to the mounting bracket. A second support bracket may have a first end pivotably connected to the connector bracket at a second pivot connection and an opposite second end pivotally connected to the mounting bracket. The linkage mechanism may include a slide link that operates to pivot the step around the step pivot connection. The slide link may have a first end slideably connected to the first support bracket and an opposite second end pivotally connected to the step at a slide link pivot connection.

The running board may include a slideout that can improve vehicle aerodynamics when operating the vehicle above a selected speed. The slideout may be moveably attached to the step. The slideout may be selectively moved between a non-extended position when the running board is arranged in either the step position or the retracted position, and an extended position when the running board is arranged in the aero position.

BRIEF DESCRIPTION OF THE DRAWINGS

The various features, advantages and other uses of the present apparatus will become more apparent by referring to the following detailed description and drawings, in which.

DETAILED DESCRIPTION

Disclosed is an automotive vehicle including an adjustable vehicle running board. It is not uncommon for vehicles, such as SUV's and pickup trucks, to employ running boards. Running boards are typically located along a side of a vehicle below a passenger compartment. The running board provides a step for enabling a passenger to more easily enter and exit the vehicle. The running boards are typically positioned adjacent a rocker panel located below the passenger compartment, and consequently, tend to reduce clearance between an underbody of the vehicle and the ground. The running board also tends to disrupt airflow around the vehicle when operating at speed, which may detrimentally effect vehicle handling and fuel efficiency. To avoid these problems, previously designed running boards may be configured to retract when not in use. While this may improve the vehicle ground clearance it may not improve the vehicle's aerodynamics. To help improve vehicle aerodynamics and ground clearance, the disclosed vehicle running board is configured to be selectively moved between multiple positions. For example, the vehicle running board may be positioned in a step position for assisting a passenger with entering and exiting the vehicle. When not used as a step, the vehicle running board may be moved to a retracted position to improve vehicle ground clearance and increase vehicle side clearance. When operating the vehicle at speed, the vehicle running board may be moved to an aero position to improve vehicle aerodynamics.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIGS. 1-6, a vehicle 20 may include an adjustable vehicle running board 22 that may be selectively moved between multiple positions. The running board 22 may be positioned in a step position to assist a passenger with entering and exiting the vehicle 20, as illustrated for example, in FIGS. 1 and 4. When not used as a step, the running board 22 may be located in a retracted position, as illustrated for example, in FIGS. 2 and 5. The retracted position provides additional ground clearance and may help reduce a risk of damage to the running board 22. When operating the vehicle 20 above a selected speed the running board 22 may be arranged in an aero position, as illustrated for example, in FIGS. 3 and 6. The aero position may improve the vehicle's aerodynamic characteristics.

Figure 1:
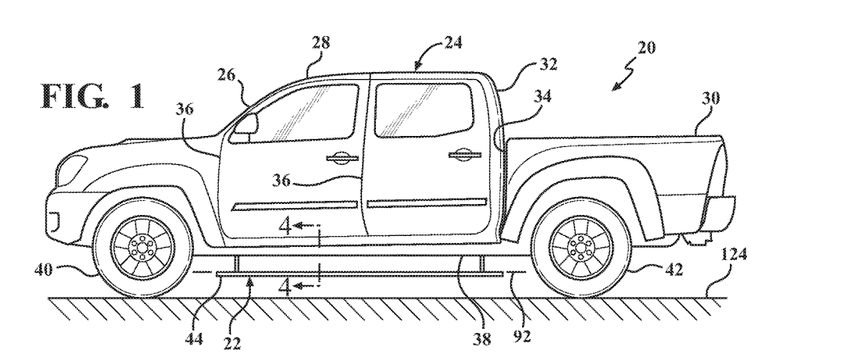
FIG. 1 is a side elevational view of an automotive vehicle employing an adjustable vehicle running board arranged in a step position.
Figure 2:
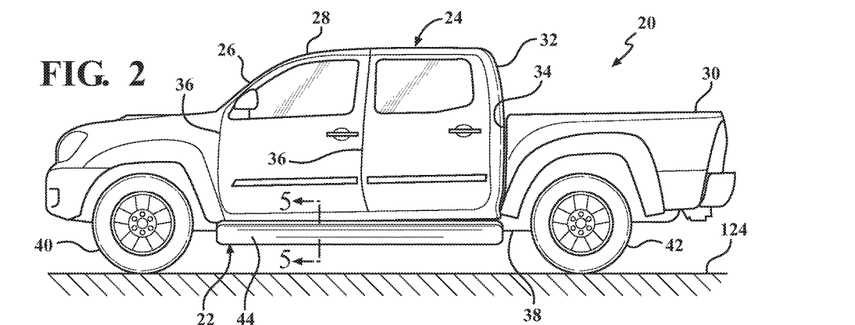
FIG. 2 is a side elevational view of the automotive vehicle with the running board arranged in a retracted position.
Figure 3:
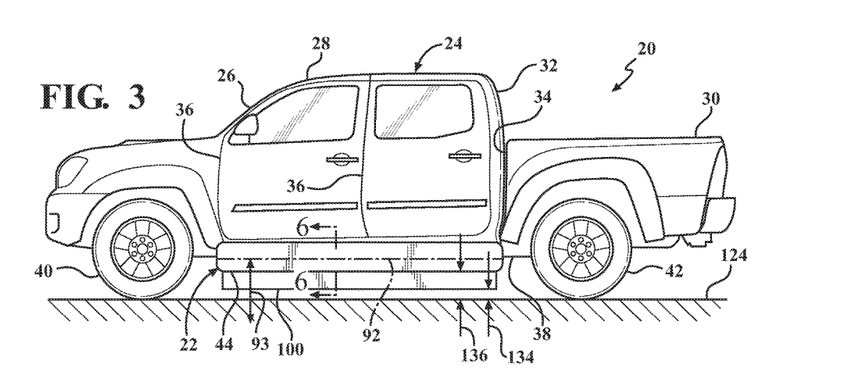
FIG. 3 is a side elevational view of the automotive vehicle with the running board arranged in an aero position.

With reference to FIGS. 1-3, the running board may be used in connection with various vehicle configurations, such as an SUV and pickup truck, as well as other vehicle configurations. SUV's and pickup trucks typically have a higher grounder clearance than other automotive vehicles, such as a passenger car. The additional ground clearance may make it more difficult to enter and exit the vehicle. The running board 22 may, for example, be used with a pickup truck 24 that includes a cab 26 having a passenger compartment 28 for transporting a vehicle driver and passengers. The cab 26 may be located forward a cargo bed 30 configured to transport cargo. A rear wall 32 of the cab 26 may be located adjacent a forward end wall 34 of the cargo bed 30. The cab 26 may include multiple doors 36 for providing access to the passenger compartment 28. The running board 22 may be generally attached to the vehicle 20 along a rocker panel 38 of the pickup truck 24 located below the cab 26. The running board 22 may be located lengthwise on the vehicle between a front wheel 40 and a rear wheel 42. The running board 22 may extend an entire length of the cab 26 or a portion thereof.

Figure 4:
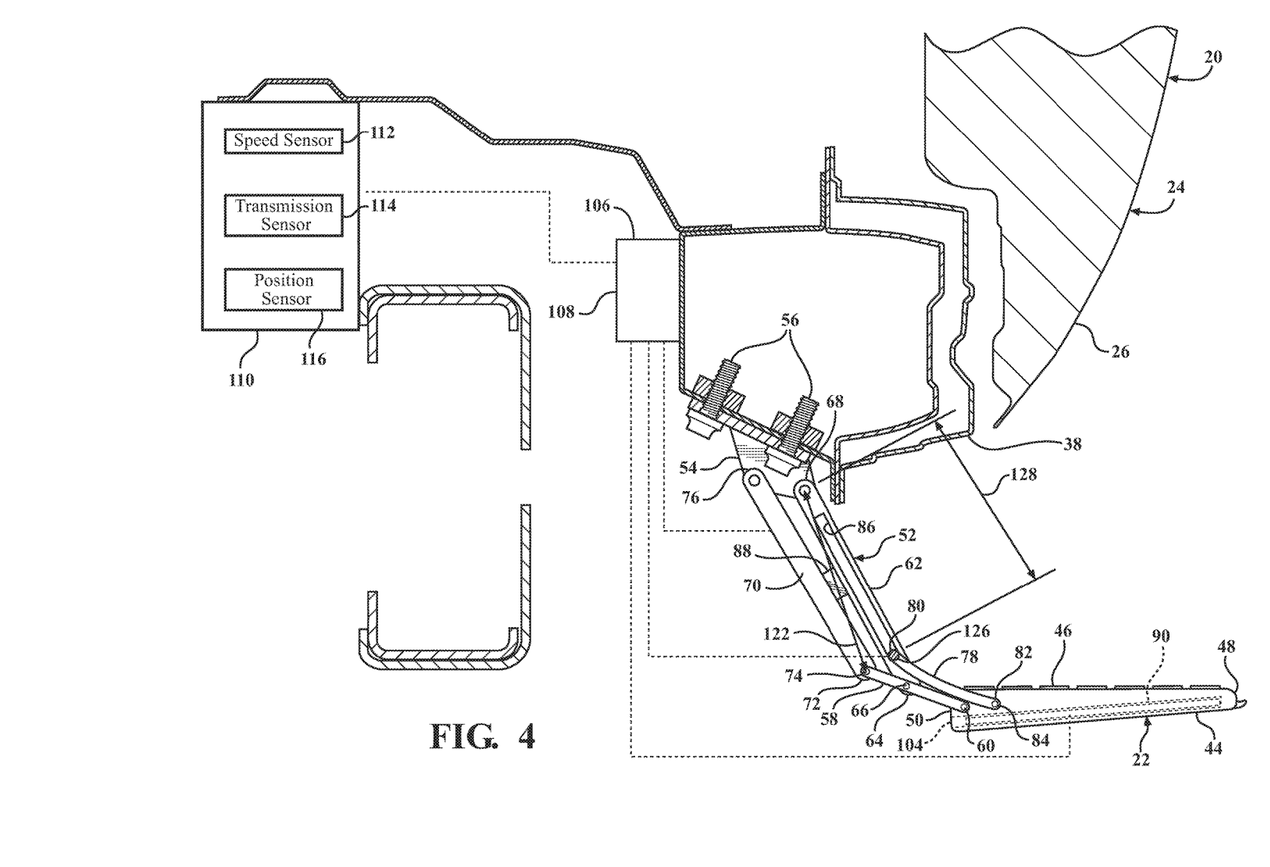
FIG. 4 is partial cross-sectional view of the running board taken along section line 4-4 in FIG. 1, with the running board arranged in the step position.

With reference to FIG. 4, the running board 22 may include a step 44 that extends lengthwise along the vehicle 20. The step 44 may include a tread 46 configured to support a foot of a user when the running board 22 is arranged in the step position, as illustrated, for example, in FIGS. 1 and 4. The tread 46 may have various configurations and features, and employ various materials for purposes of enhancing traction and to help prevent a user's foot from slipping on the tread. The step 44 may have an outside edge 48 located outboard an inside edge 50 of the step 44 when the running board 22 is arranged in the step position.

The running board 22 may employ a linkage mechanism 52 with multiple interconnected linkages for attaching the step 44 to the vehicle 20. The linkage mechanism 52 may be used to move the step 44 between its various operating positions. The linkage mechanism 52 may be connected to the vehicle 20 by a mounting bracket 54. Various permanent or detachable connection mechanisms may be used to attach the mounting bracket 54 to the vehicle 20, such as bolts 56, screws, welding, as well as other methods.

The linkage mechanism 52 may include a connector bracket 58 pivotally connected to the step 44 at a step pivot connection 60. A first support bracket 62 may have a first end 64 pivotably connected to the connector bracket 58 at a first pivot connection 66 and an opposite second end 68 pivotally connected to the mounting bracket 54. A second support bracket 70 may have a first end 72 pivotably connected to the connector bracket 58 at a second pivot connection 74 and an opposite second end 76 pivotally connected to the mounting bracket 54. The first pivot connection 66 may be located along a length of the connector bracket 58 between the step pivot connection 60 and the second pivot connection 74. The connector bracket 58, the first support bracket 62 and the second support bracket 70 move in unison when moving the step 44 between its various operating positions.

The linkage mechanism may include a slide link 78 that operates to pivot the step 44 around the step pivot connection 60. The slide link 78 may have a first end 80 slideably connected to the first support bracket 62 and an opposite second end 82 pivotally connected to the step 44 at a slide link pivot connection 84. The slide link pivot connection 84 may be located transversely along the step 44 between the step pivot connection 60 and the outside edge 48 of the step 44. The slide link 78 may have a generally linear configuration or may have a curved contour, as illustrated, for example, in FIGS. 4-6.

The first end 80 of the slide link 78 may engage an elongated slot 86 formed in the first support bracket 62. The slot 86 extends generally lengthwise along a longitudinal length of the first support bracket 62. The first end 80 of the slide link 78 may be selectively moved along the slot 86 to cause the step 44 to pivot about the step pivot connection 60. Moving the first end 80 of the slide link 78 toward the mounting bracket 54 causes the step 44 to pivot counterclockwise (when viewed from the perspective of FIG. 4) about the step pivot connection 60, whereas moving the first end 80 of the slide link 78 away from the mounting bracket 54 causes the step 44 to pivot clockwise about the step pivot connection 60.

The linkage mechanism 52 may employ a stop block 88 located in a gap between the first support bracket 62 and the second support bracket 70. The stop block 88 limits pivoting movement of the first support bracket 62 and the second support bracket 70 about their respective connections to the mounting bracket 54 in both the clockwise and counter-clockwise directions. One side of the stop block 88 may be attached to either the first support bracket 62 or the second support bracket 70. An opposite side of the stop block 88 is displaced from the support bracket to which it is not attached as the linkage mechanism 52 moves through its range of travel. The stop block 88 engages the support bracket to which it is not attached when the first support bracket 62 and the second support bracket 70 reach their limit of travel in the clockwise and counter-clockwise directions.

Figure 5:
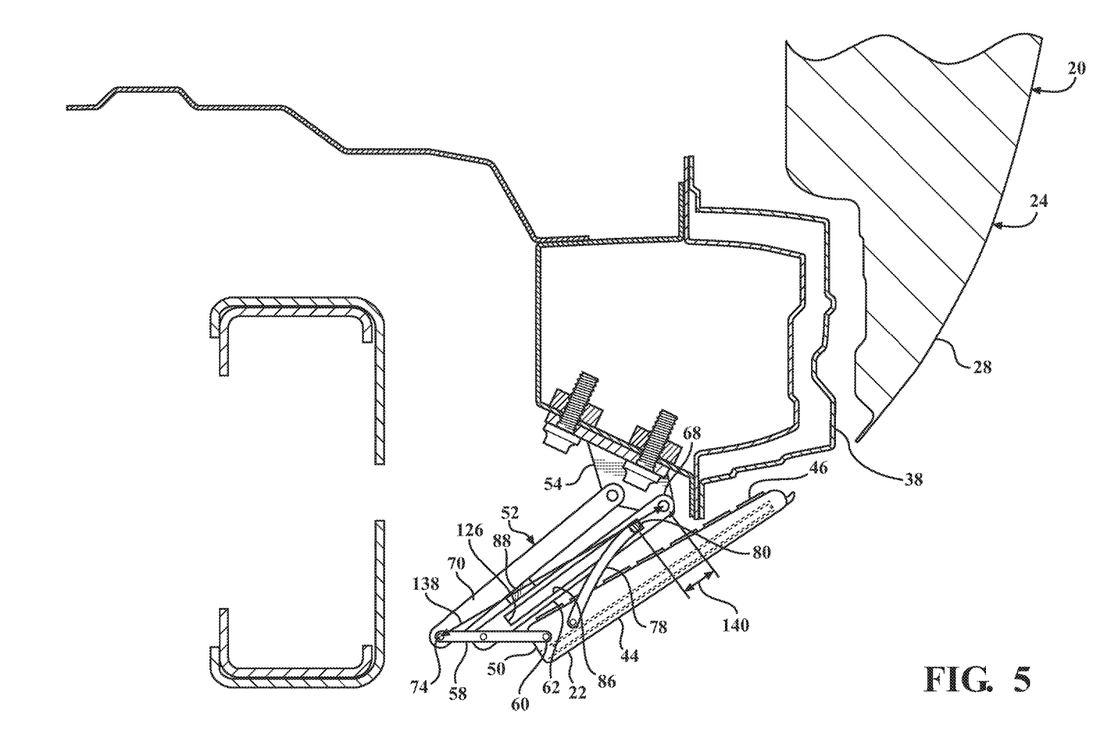
FIG. 5 is a partial cross-sectional view of the running board taken along section line 5-5 in FIG. 2, with the running board arranged in the retracted position.
Figure 6:
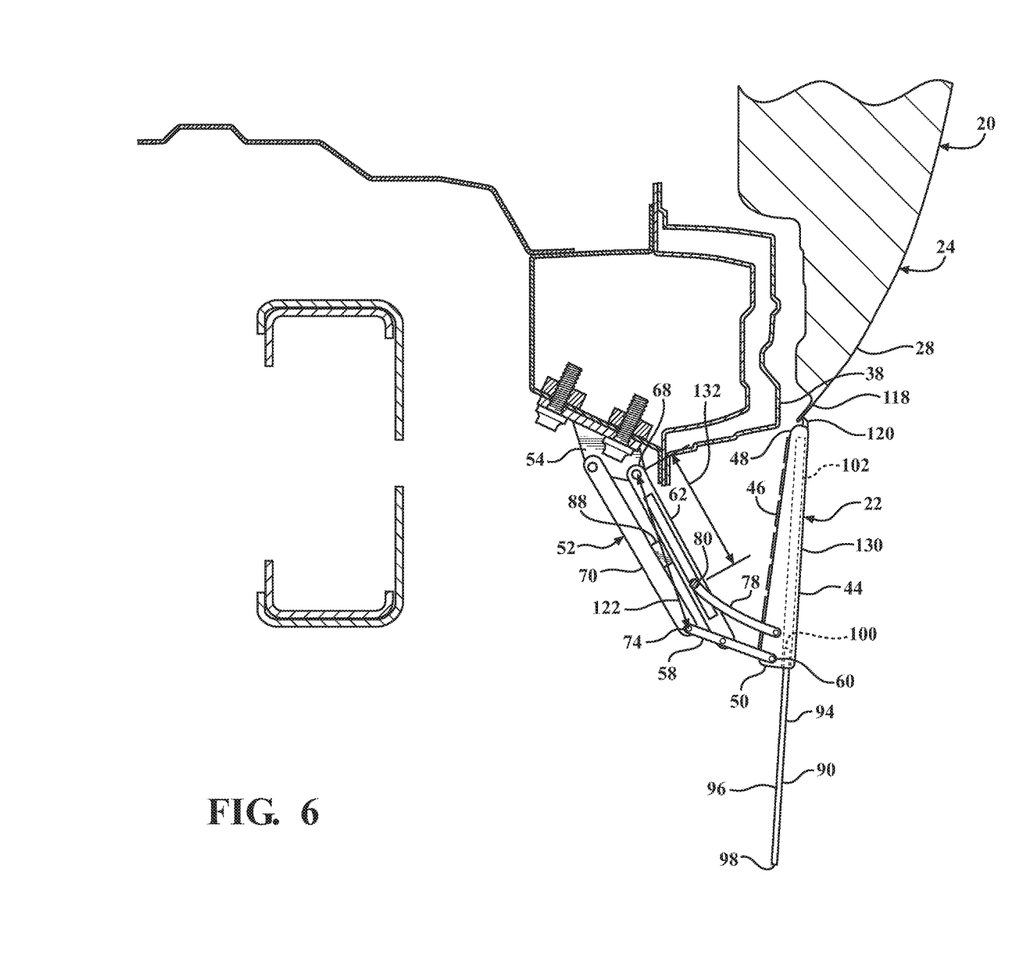
FIG. 6 is a partial cross-sectional view of the running board taken along section line 6-6 in FIG. 3, with the running board arranged in the aero position.

With reference to FIGS. 3, 4 and 6, the running board 22 may include a slideout 90 that may operate to improve vehicle aerodynamics when operating the vehicle 20 above a selected speed. The slideout 90 may be moveably attached to the step 44. The slideout 90 may be selectively moved between a non-extended position when the running board is arranged in either the step position (see, for example, FIG. 4) or the retracted position (see, for example, FIG. 5), and an extended position when the running board is arranged in the aero position (see, for example, FIG. 6). The slideout 90 may be slideably attached to the step 44 and is moveable transversely relative to a longitudinal axis 92 of the step 44 along a path of travel 93 between the extended and non-extended positions. The slideout 90 may include an outer surface 94 that faces away from a center of the vehicle 20 (i.e., is viewable from an exterior of the vehicle) when the running board 22 is arranged in the aero position and the slideout 90 is in the extended position, and an opposite inner surface 96 that faces inward toward a center of the vehicle 20. The slideout 90 may include a proximal edge 98 that extends lengthwise along a length of the slideout 90 and an opposite distal edge 100.

The slideout 90 may be moveably received within a storage slot 102 formed in the step 44. The storage slot 102 has an opening 104 that extends lengthwise along the inner edge 50 of the step 44. The slideout 90 may be entirely received within the storage slot 102 when the slideout 90 is arranged in the non-extended position. The slideout 90 extends outward from the inside edge 50 of the step 44 when the slideout 90 is arranged in the extended position. The distal edge 100 of the slideout 90 is disposed within the storage slot 102 when the slideout 90 is arranged in the extended and non-extended positions.

A drive mechanism 106 may include an actuator 108 for actuating the linkage mechanism 52, including pivoting the first and the second support brackets 62,70 about their respective connections to the mounting bracket 54, moving the first end 80 of the slide link 78 along its connection to the first support bracket 62 and moving the slideout 90 between its extended and non-extended positions. The actuator 108 may be operably connected to the various driven components. The drive mechanism 106 may include various actuators, including, but not limited to, hydraulic, pneumatic, electrical, and electro-mechanical devices. Separate actuators 108 may be used to independently operate the first support bracket 62 and the second support bracket 70, the slide link 78 and the slideout 90. Alternatively, a single actuator 108 may be used to operate more than one component. For example, a single actuator 108 may be used to pivot both the first support bracket 62 and the second support bracket 70 about their respective pivot connections to the mounting bracket 54. It is not necessary that both the first support bracket 62 and the second support bracket 70 be actively moved about their respective pivot connections to the mounting bracket 54. Depending on the application, either the first support bracket 62 or the second support bracket 70 may be actively actuated, with the remaining support bracket being passively moved in response to movement of the actuated support bracket.

A controller 110 may be employed for controlling operation of the actuator 108. The controller 110 may be a standalone device or may be entirely or partially integrated with one or more devices, such as a vehicle electronic control module (ECM). The controller 110 may be configured to automatically control operation of the running board 22 in response to receipt of various vehicle operating data. The vehicle operating data may be collected by various vehicle sensors, such as, for example, a vehicle speed sensor 112, transmission sensor 114, and a running board position sensor 116. The controller 110 may use the collected data when controlling operation of the running board 22. For example, if the controller 110 determines the vehicle 20 is not moving (i.e., speed is zero), the transmission is positioned in park, and the running board is currently positioned in the retracted position, the controller 110 may proceed to transmit a signal to the actuator 108 causing the actuator 108 to move the running board 22 from the retracted position, as illustrated, for example, in FIG. 5, to the step position, as illustrated, for example, in FIG. 4.

The controller 110 may also be configured to move the running board 22 from the retracted position to the aero position, as illustrated, for example, in FIG. 6, and move the slideout 90 from the non-extended position, as illustrated, for example, in FIGS. 4 and 5, to the extended position, as illustrated, for example, in FIG. 6, when the controller determines the vehicle is operating above a selected speed. When the controller 110 determines the vehicle 20 is operating below the selected speed it may send a signal to the actuator 108 causing the slideout 90 to return to the non-extended position and the step 44 to the retracted position.

The controller 110 may be configured to control operation of the running board 22 in response to input received from an operator actuated input device, such as a button or a switch. The vehicle 20 may, for example, include a button located within the passenger compartment 28, which when actuated by a passenger, may cause the controller 110 to instruct the actuator 108 to move the running board 22 between the retracted position and the step position. The vehicle 20 may also include an actuator that may be activated by a passenger to cause the controller 110 to move the running board 22 between the retracted position and the aero position. The controller 110 may be configured for both automatic and operator controlled actuation of the running board 22.

With reference to FIG. 6, the outside edge 48 of the step 44 may engage an outer region 118 of the vehicle 20 when the running board 22 is arranged in the aero position. To help improve aerodynamics, the step 44 may include a seal 120 attached to the outside edge 48 of the step 44. The seal 120 may extend along the entire length of the step 44 or just portion thereof. The seal 120 may be constructed from a generally flexible material that may conform to a side contour of the vehicle 20 when the running board 22 is arranged in the aero position.

With reference to FIGS. 1 and 4, the running board may be selectively located in the step position. The first support bracket 62 and the second support bracket 70 may be rotated fully counter-clockwise (as viewed from the perspective of FIG. 4) about their respective connections to the mounting bracket 54 when the running board 22 is arranged in the step position. The stop block 88, or another device configured to limit counter-clockwise rotation of the first support bracket 62 and the second support bracket 70, may be used to control the orientation of the first and second support brackets 62,70 when the running board 22 is arranged in the step position. The second end 68 of the first support bracket 62 is spaced from the second pivot connection 74 by a first support bracket spacing 122 when the running board 22 is arranged in the step position.

The tread 46 of the step 44 may be oriented generally horizontally (i.e., parallel to a ground 124) when the running board 22 is arranged in the step position. The slide link 78 may be used to control the position of the step 44 relative to the vehicle 20 and the ground 124. Moving the first end 80 of the slide link 78 lengthwise along the first support bracket 62 in a direction away from the second end 68 of the first support bracket 62 and toward the first end 64 causes the step 44 to rotate clockwise (as viewed from the perspective of FIG. 4) about the step pivot connection 60. The step 44 can be oriented in the step position by positioning the first end 80 of the slide link 78 adjacent an end 126 of the slot 86. The first end 80 of the slide link 78 is spaced a first slide link distance 128 from the second end 68 of the first support bracket 62 when the running board 22 is arranged in the step position.

With reference to FIGS. 3 and 6, the running board 22 may be selectively located in the aero position. The first support bracket 62 and the second support bracket 70 may be rotated fully counter-clockwise (as viewed from the perspective of FIG. 6) about their respective connections to the mounting bracket 54 when the running board is arranged in the aero position. The stop block 88, or another device configured to limit counter-clockwise rotation of the first support bracket 62 and the second support bracket 70, may be used to control the orientation of the first and second support brackets 62,70 when the running board 22 is arranged in the aero position. The first support bracket 62 and the second support bracket 70 are oriented in generally the same orientation when the running board 22 is arranged in the step position (see, for example, FIG. 4) and the aero position. The second end 68 of the first support bracket 62 is spaced from the second pivot connection 74 by the first support bracket spacing 122 when the running board 22 is arranged in the aero position.

The tread 46 of the step 44 may be oriented generally vertically relative to the ground 124 when the running board 22 is arranged in the aero position. A bottom surface 130 of the step 44 may be visible when viewed from a perspective alongside the vehicle 20 and the tread 46 may be hidden from view when the step 44 is arranged in the aero position.

The step 44 may be arranged in the aero position by positioning the first end 80 of the slide link 78 at a second slide link distance 132 from the second end 68 of the first support bracket 62. The second slide link distance 132 is less than the first slide link distance 128.

With the step 44 arranged in the aero position the slideout 90 may be moved from the non-extended position (see, for example, FIGS. 4 and 5) to the extended position, as illustrated, for example, in FIG. 6. The slideout 90 may be moved to the extended position when operating the vehicle 20 above a selected speed. Arranging the slideout 90 in the extended position may help reduce vehicle aerodynamic drag to improve fuel efficiency and vehicle handling. Arranging the slideout 90 in the extended position reduces a distance between an underbody of the vehicle 20 and the ground 124 to improve vehicle aerodynamics. The distal edge 100 of the slideout 90 may be located a first slideout distance 134 from the ground 124 with the slideout arranged in the extended position and a second slideout distance 136 with the slideout arranged in the non-extended position.

With reference to FIGS. 2 and 5, the running board 22 may be selectively located in the retracted position. The first support bracket 62 and the second support bracket 70 may be rotated fully clockwise (as viewed from the perspective of FIG. 5) about their respective connections to the mounting bracket 54 when positioning the running board 22 in the retracted position. The stop block 88, or another device configured to limit clockwise rotation of the first and second support brackets 62,70, may be used to control the orientation of the first support bracket 62 and the second support bracket 70 when the running board 22 is arranged in the retracted position. The second end 68 of the first support bracket 62 is spaced from the second pivot connection 78 by a second support bracket spacing 138 when the running board 22 is arranged in the retracted position. The second support bracket spacing 138, with the running board 22 arranged in the retracted position, is greater than the first support bracket spacing 122 with the running board 22 is arranged in the step position.

The tread 46 of the step 44 may be oriented at an incline relative to the ground 124 when the running board 22 is arranged in the retracted position. The first end 80 of the slide link 78 may be displaced from the end 126 of the slot 86 when the step 44 is arranged in the retracted position. The first end 80 of the slide link 76 may be spaced a third slide link distance 140 from the second end 68 of the first support bracket 62 when the running board 22 is arranged in the retracted position. The third slide link distance 140 is less than the first slide link distance 128 and the second slide link distance 132.

It is intended that the scope of the present methods and apparatuses be defined by the following claims. However, it must be understood that the disclosed systems and methods may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. An adjustable vehicle running board comprising:
   a step comprising a tread for supporting a foot of a user, the step moveable between an aero position, a step position and a retracted position;
   a first support bracket having a first end coupled to the step and an opposite second end connectable to a vehicle;
   a slide link comprising a first end slideably connected to the first support bracket and an opposite second end pivotally connected to the step at a slide link pivot connection, the first end of the slide link moveable along a length of the first support bracket and positionable at a first slide link distance from the second end of the first support bracket when the step is arranged in the step position and a second slide link distance from the second end of the first support bracket when the step is arranged in the aero position, the first slide link distance being greater than the second slide link distance,
   a connector bracket pivotally connected to the first end of the first support bracket at a first pivot connection and pivotally connected to the step at a step pivot connection; and
   a second support bracket having a first end pivotally counted to the connector bracket at a second pivot connection and an opposite second end connectable to the vehicle, the second pivot connection being located at a first support bracket spacing from the second end of the first support bracket when the step is arranged in the step position and at a second support bracket spacing from the second end of the first support bracket when the step is arranged in the retracted position, the second support bracket spacing being greater than the first support bracket spacing.

2. The adjustable vehicle running board of claim 1, wherein the first pivot connection is located between the second pivot connection and the step pivot connection.

3. The adjustable vehicle running board of claim 1, wherein the second pivot connection is located at the first support bracket spacing when the step is arranged in the aero position.

4. The adjustable vehicle running board of claim 1, wherein the first end of the slide link is positioned at a third slide link distance from the second end of the first support bracket when the step is arranged in the retracted position, the first slide link distance and the second slide link distance being greater than the third slide link distance.

5. The adjustable vehicle running board of claim 4, wherein the second pivot connection is located at the second support bracket spacing and the first end of the slide link is located at the third slide link distance when the step is arranged in the retracted position.

6. An adjustable vehicle running board comprising:
   a step comprising a tread for supporting a foot of a user, the step moveable between an aero position and a step position, wherein the step comprises an outside edge extending lengthwise along the step and an opposite inside edge, the outside edge located outboard the inside edge when the adjustable vehicle running board is attached to the vehicle and the step is arranged in the step position;
   a first support bracket having a first end coupled to the step and an opposite second end connectable to a vehicle;
   a slide link comprising a first end slideably connected to the first support bracket and an opposite second end pivotally connected to the step at a slide link pivot connection, the first end of the slide link moveable along a length of the first support bracket and positionable at a first slide link distance from the second end of the first support bracket when the step is arranged in the step position and a second slide link distance from the second end of the first support bracket when the step is arranged in the aero position, the first slide link distance being greater than the second slide link distance, and
   a slideout moveably connected to the step, the slideout moveable transversely relative to a longitudinal axis of the step between an extended position and a non-extended position.

7. The adjustable vehicle running board of claim 6, wherein the slideout is located within a slot formed along the inside edge of the step.

8. The adjustable vehicle running board of claim 6, wherein the slideout extends outward from the inside edge of the step when arranged in the extended position.

9. An adjustable vehicle running board comprising:
   a step comprising a tread for supporting a foot of a user, the step moveable between an aero position and a step position;
   a first support bracket having a first end coupled to the step and an opposite second end connectable to a vehicle, the step pivotable relative to the first support bracket between the step position and the aero position; and
   a slideout moveably connected to the step, the slideout moveable transversely relative to a longitudinal axis of the step between an extended position and a non-extended position, the slideout located in the extended position when the step is located in the aero position and the non-extended position when the step is located in the step position.

10. The adjustable vehicle running board of claim 9 further comprising a slide link having a first end slideably connected to the first support bracket and an opposite second end pivotally connected to the step at a slide link pivot connection, the first end of the slide link moveable along a length of the first support bracket and positionable at a first slide link distance from the second end of the first support bracket when the step is arranged in the step position and a second slide link distance from the second end of the first support bracket when the step is arranged in the aero position, the first slide link distance being greater than the second slide link distance.

11. The adjustable vehicle running board of claim 10, wherein the step is movable to a retracted position, the adjustable vehicle running board further comprising:
   a connector bracket pivotally connected to the first end of the first support bracket at a first pivot connection and pivotally connected to the step at a step pivot connection; and
   a second support bracket having a first end pivotally counted to the connector bracket at a second pivot connection and an opposite second end connectable to a vehicle, the second pivot connection being located at a first support bracket spacing from the second end of the first support bracket when the step is arranged in the step position and the aero position, and the second pivot connection being located at a second support bracket spacing from the second end of the first support bracket when the step is arranged in the retracted position, the second support bracket spacing being greater than the first support bracket spacing.

12. The adjustable vehicle running board of claim 11, wherein the first end of the slide link is positioned at a third slide link distance from the second end of the first support bracket when the step is arranged in the retracted position, the second slide link distance being greater than the third slide link distance and the first slide link distance being greater than the second slide link distance.

13. The adjustable vehicle running board of claim 9, wherein the step comprises an outside edge extending lengthwise along the step and an opposite inside edge, the outside edge located outboard the inside edge when the adjustable vehicle running board is attached to the vehicle and the step is arranged in the step position, the slideout located within a slot formed along the inside edge of the step.

14. The adjustable vehicle running board of claim 13, wherein the slideout extends outward from the inside edge of the step when the slideout is arranged in the extended position and is retracted into the step when the slideout is arranged in the non-extended position.

15. A vehicle comprising:
   a vehicle body defining a passenger compartment, the vehicle body comprising at least one door providing access to the passenger compartment;
   a step located below the door and comprising a tread for supporting a foot of a user, the step moveable between an aero position and a step position;
   a first support bracket having a first end coupled to the step and an opposite second end connected to the vehicle, the step pivotable relative to the first support bracket between the step position and the aero position; and
   a slideout moveably connected to the step, the slideout moveable transversely relative to a longitudinal axis of the step between an extended position, in which a distal edge of the slideout is located at a first slideout distance from a ground surface supporting the vehicle, and a non-extended position, in which the distal edge of the slideout is located at second slideout distance from the ground surface, the second slideout distance being greater than first slideout distance.

16. The vehicle of claim 15 further comprising a slide link having a first end slideably connected to the first support bracket and an opposite second end pivotally connected to the step at a slide link pivot connection, the first end of the slide link moveable along a length of the first support bracket and positionable at a first slide link distance from the second end of the first support bracket when the step is arranged in the step position and a second slide link distance from the second end of the first support bracket when the step is arranged in the aero position, the first slide link distance being greater than the second slide link distance.

17. The vehicle of claim 16, wherein the step is movable to a retracted position, the vehicle further comprising:

a connector bracket pivotally connected to the first end of the first support bracket at a first pivot connection and pivotally connected to the step at a step pivot connection; and a second support bracket having a first end pivotally counted to the connector bracket at a second pivot connection and an opposite second end connected to a vehicle, the second pivot connection being located at a first support bracket spacing from the second end of the first support bracket when the step is arranged in the step position and the aero position, and the second pivot connection being located at a second support bracket spacing from the second end of the first support bracket when the step is arranged in the retracted position, the second support bracket spacing being greater than the first support bracket spacing.

18. The vehicle of claim 17, wherein the first end of the slide link is positioned at a third slide link distance from the second end of the first support bracket when the step is arranged in the retracted position, the second slide link distance being greater than the third slide link distance and the first slide link distance being greater than the second slide link distance.

19. The vehicle of claim 17, wherein the slideout is located in the extended position when the step is located in the aero position and the non-extended position when the step is located in the step position and the retracted position.

* * * * *

UNITED STATES PATENT AND TRADEMARK OFFICE
CERTIFICATE OF CORRECTION

Page 1 of 1

PATENT NO. : 10,081,302 B1
APPLICATION NO. : 15/640905
DATED : September 25, 2018
INVENTOR(S) : Scott L. Frederick, Scott P. Robison and Adam D. Holmstrom It is certified that error appears in the above-identified patent and that said Letters Patent is hereby corrected as shown below:

Column 8, Line 49, the portion of Claim 1 reading:
"counted"
Should read:
--connected--

Column 10, Line 11, the portion of Claim 11 reading:
"counted"
Should read:
--connected--

Column 11, Line 14, the portion of Claim 17 reading:
"counted"
Should read:
--connected--

Signed and Sealed this
Twenty-seventh Day of November, 2018

Andrei Iancu
*Director of the United States Patent and Trademark Office*